Sept. 24, 1940.   J. C. AYDELOTT   2,215,993
SYSTEM OF CONTROL
Filed Aug. 30, 1939
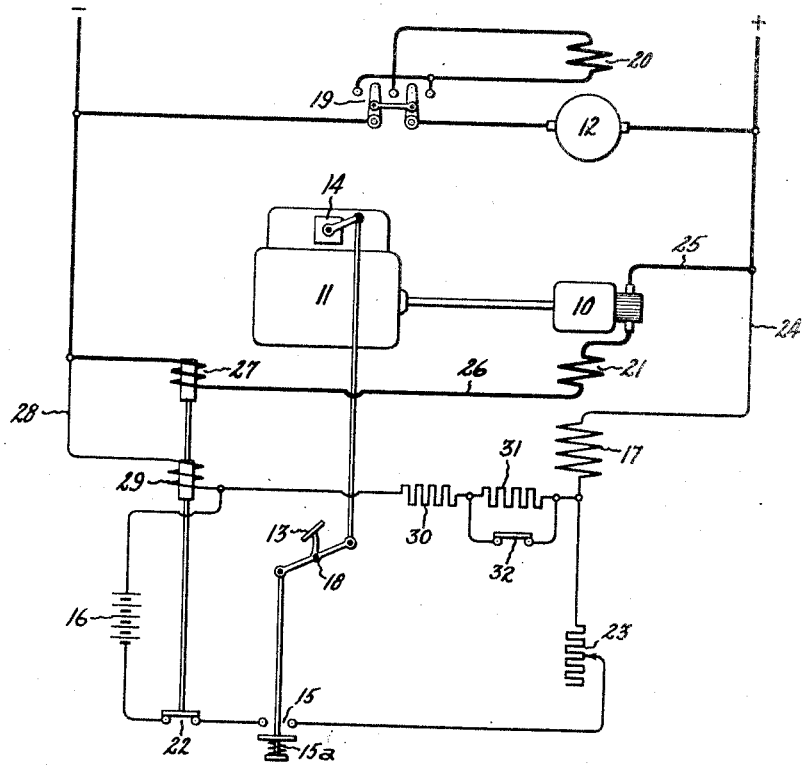
Inventor:
John C. Aydelott,
by Harry E. Dunham
His Attorney.

Patented Sept. 24, 1940

2,215,993

UNITED STATES PATENT OFFICE 2,215,993

SYSTEM OF CONTROL

John C. Aydelott, Erie, Pa., assignor to General Electric Company, a corporation of New York Application August 30, 1939, Serial No. 292,653

3 Claims. (Cl. 290—17)

My invention relates to systems of control, more particularly to prime mover driven, generator motor driving systems for vehicles such as passenger buses, and has for its object means for assuring rapid build-up of the generator voltage under all conditions of operation.

It is customary with Diesel or other internal combustion engine driven electric buses to provide a storage battery for supplying excitation to the generator shunt field to obtain a more rapid build-up of the generator voltage. The battery is ordinarily disconnected from the shunt field by a suitable relay when the generator voltage builds up to a determined value. While this is satisfactory for acceleration from low speed or stand-still, it does have the disadvantage of removing the battery excitation too soon when the generator is accelerated after the generator has been idling with the bus coasting at a fairly high speed. As a result, the driving engine has a tendency to race before the generator again picks up load and supplies current to the motor.

In carrying out my invention, I provide a relay for disconnecting the battery from the generator shunt field which relay is provided with two operating coils connected to be energized cumulatively. One of these coils is connected in the armature circuit of the generator and the other coil is connected in circuit with the generator shunt field. When the bus is being accelerated from a stand-still or a low speed, this relay is picked up by the coil in the generator armature circuit in response to the generator current when the generator supplies the predetermined amount of current to the motor. When the generator is accelerated to supply current to the motor with the bus coasting at a substantial speed, the battery is disconnected by the coil in circuit with the shunt field which coil is responsive to the generator voltage.

Thus with this arrangement, the generator is substantially loaded, i. e., supplies a substantial amount of energy to the motor under both conditions. When accelerating from stand-still or low speed, the battery is disconnected when the generator current reaches a predetermined substantial value but the generator voltage at this time is low. On the other hand, when accelerating from a substantially high coasting speed, the battery is disconnected when the generator current is low, but with a substantially high generator voltage.

For a more complete understanding of my invention, reference should be had to the accompanying drawing, the single figure of which is a simplified diagram of a system of control embodying my invention.

Referring to the drawing, the invention is disclosed in one form in connection with a prime mover, shown as a Diesel engine, driven electric generator motor drive for a passenger bus. The generator 10 is driven by the Diesel engine 11 and supplies direct current to the direct current driving motor 12. The engine 11 is controlled by a manually operated device shown as a pedal 13 which when depressed operates the throttle 14 to accelerate the engine and closes a switch 15 to connect an auxiliary source of direct current, shown as a storage battery 16, in circuit with the shunt field 17 for the generator. As shown, the pedal is pivoted at the point 18. A spring connection 15a is provided between the pedal and the switch contact to provide for additional movement of the pedal to accelerate the engine after the switch 15 is closed. A manually operated reversing switch 19 is provided for reversing the connections of the series field 20 for the motor for forward or reverse operation of the vehicle. The generator is provided also with a series field winding 21.

Preferably the engine 11 is started with the reversing switch 19 in its neutral or open circuit position, as shown. With the engine started, and idling at a low speed, the switch 19 is thrown to the forward or reverse position as desired. The pedal 13 is then depressed to accelerate the engine and also close the switch 15 whereby the battery 16 is connected to supply teasing exciting current to the shunt field 17. This circuit leads from the negative side of the battery through the switch 22 which is closed, the switch 15 and adjustable resistance 23, the shunt field winding 17 to the supply main bus 24 and thence through the conductor 25, the armature of the generator conductor 26, the current coil 27 for the switch 22, the conductor 28, the coil 29 for the switch 22 and then to the other side of the battery. While the field winding 17 is in parallel with its field resistances 30 and 31 in this teaser circuit, the resistances 30 and 31 are of such magnitude as to pass but little current.

As a result of this excitation from the battery and the fact that the battery by-passes the field resistor 30, the generator builds up faster than it otherwise would and thereby expedites the starting of the motor 12. The generator voltage builds up in the same direction as the voltage of the battery and therefore assists the battery in exciting the shunt field. At first, with the motor 12 at rest, the generator will supply current to the motor at a very low voltage. When the current supplied to the motor and passing through the coil 27 reaches a substantial value, such as approximately full load current for the motor, the coil 27 opens the switch 22 and disconnects the battery from the shunt field.

At this time and also when accelerating from a low running speed, the motor voltage is low and therefore a low generator voltage only is required to force a large current through the generator and motor circuit. The generator from now on excites the field winding 17 without the help of the battery, the generator voltage increasing to full value.

In the event that the bus is accelerated to fairly high speed, such as 25 M. P. H. and is allowed to coast at that speed, the pedal 13 being released, the voltages of the generator and motor are very low. The voltage of the generator is low because of its low speed while the motor voltage is low because it is series excited and is supplied with only enough current by the generator to maintain its voltage equal to the voltage of the generator.

Assuming now that the operator after coasting a short distance at a high speed, such as 25 M. P. H. or higher, desires to apply a drive torque to the vehicle, he then depresses the pedal 13 to accelerate the engine and close the teasing switch 15. In order now that the generator can take on any substantial driving load, i. e., supply a substantial amount of current to the motor 12, the generator voltage must first increase to a value corresponding to the speed of the motor. The battery 16 forces a teasing exciting current through the shunt field winding, as previously described, thus expediting the increase in voltage of the generator. When the voltage reaches a predetermined value, which may require an appreciable interval of time such as from 1 or more seconds, the voltage of the generator with the help of the battery becomes great enough to force a predetermined current through the shunt field although the generator current supplied to the motor may still be low, much lower than the value required to cause the coil 27 to open the switch 22. In response to this predetermined current through the shunt field and the coil 29, the coil 29 opens the switch 22 and thereby terminates the field teasing from the battery. As a result, the generator is artificially loaded to some extent by the prolonged teasing action and, furthermore, the prolonged teasing action causes the generator to assume the driving load much quicker than it otherwise would. This means that the generator puts a driving load or torque on the engine almost immediately and racing of the engine before the generator has time to build up and take on a load is prevented.

If under certain conditions of operation as on a long hill, the generator field strength is so strong as to partially stall the engine with resulting loss of power, then switch 32 may be opened to insert resistance 31 in the field circuit which will allow the engine to come up to normal speed and full power, thus taking the bus up the hill at higher speed.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. The combination with a direct current traction motor, of a generator for supplying current to said motor, said generator being provided with a shunt field winding, a prime mover for driving said generator, an accelerating device for said prime mover, a storage battery, a control switch for connecting said battery in a circuit with said shunt field winding, a common actuating means for said accelerating device and said control switch for operating said switch to connect said battery in circuit with said shunt field, a normally closed automatic switch in circuit with said battery, a pair of coils for operating said automatic switch to disconnect said battery from said shunt field winding, and connections for connecting said coils respectively in circuit with the armature of said generator and in circuit with said shunt field winding.

2. The combination in a vehicle drive system of a motor for driving a vehicle, a generator for supplying current to said motor, said generator being provided with a field winding, a prime mover for driving said generator, an accelerating device for said prime mover, current supply means, a control switch for connecting said current supply means in a circuit with said field winding for supplying excitation current to said winding, a member connected to said accelerating device and said control switch and movable to accelerate said prime mover and simultaneously therewith close said control switch, a normally closed automatic switch in circuit with said battery, a coil responsive to the current in said generator for opening said automatic switch during acceleration from low vehicle speeds when the voltage of said generator is low, and a second coil responsive to the voltage of said generator for opening said automatic switch during acceleration from high vehicle speeds when the current in said generator is low.

3. The combination in a vehicle drive system of a direct current motor for driving a vehicle, a generator for supplying current to said motor, said generator being provided with a shunt field winding, a prime mover for driving said generator, an accelerating device for said prime mover, a storage battery, a normally open control switch for connecting said battery in a circuit with said shunt field winding for supplying excitation current to said winding, a manually operated member connected to said accelerating device and said control switch and movable to accelerate said prime mover and simultaneously therewith close said control switch, a normally closed automatic switch in circuit with said battery, a coil responsive to the current in said generator for opening said automatic switch during acceleration from low vehicle speeds when the voltage of said generator is low, and a coil connected in circuit with said shunt field winding so as to be responsive to the voltage of said generator for opening said automatic switch during acceleration from high vehicle speeds when the current in said generator is low.

JOHN C. AYDELOTT.